June 20, 1967  M. L. FELTON  3,327,315
RECORDING INSTRUMENT WITH VARIABLE PRESSURE INKING SYSTEM
Filed March 15, 1965  2 Sheets-Sheet 1

INVENTOR.
MICKEY L. FELTON

Attorneys

June 20, 1967      M. L. FELTON      3,327,315
RECORDING INSTRUMENT WITH VARIABLE PRESSURE INKING SYSTEM
Filed March 15, 1965      2 Sheets-Sheet 2
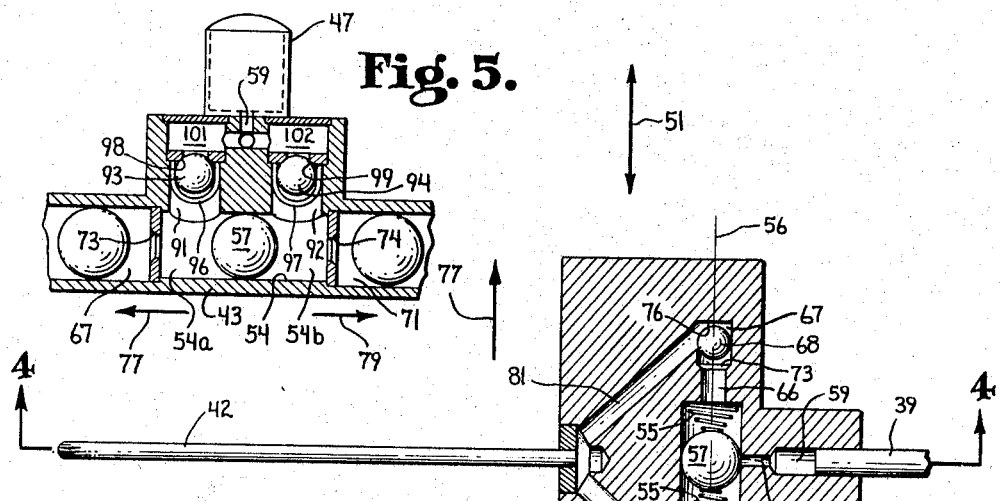
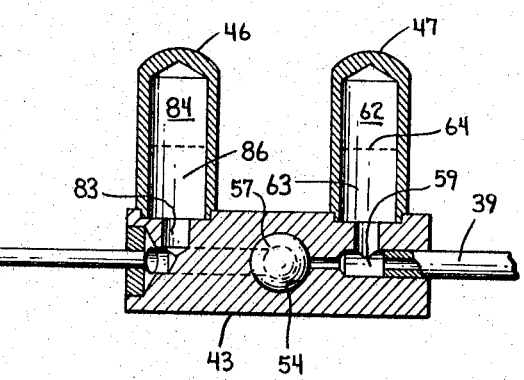
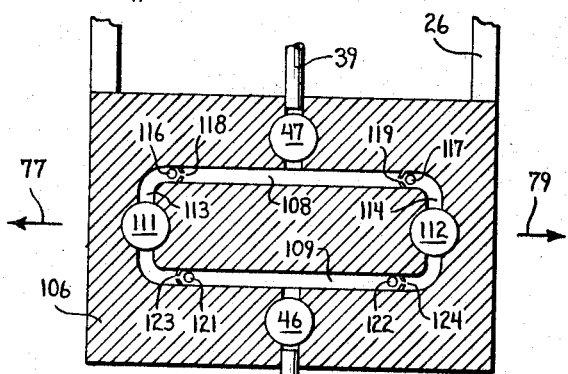
INVENTOR.
MICKEY L. FELTON
BY Kirkwood, Woodard, Smith & Weikart
Attorneys United States Patent Office 3,327,315
Patented June 20, 1967

3,327,315
RECORDING INSTRUMENT WITH VARIABLE
PRESSURE INKING SYSTEM
Mickey L. Felton, Noblesville, Ind., assignor to Esterline-Angus Instrument Company, Inc., Indianapolis, Ind., a corporation of Delaware
Filed Mar. 15, 1965, Ser. No. 439,918
16 Claims. (Cl. 346—140)

This invention relates generally to recording instruments and particularly to an instrument capable of high-speed ink writing on record chart paper in response to input signals applied to the instrument.

Chart recording instruments are well known and widely used and use various means of marking paper or some other medium to make a record of the pattern of input signals to the instrument. Ink is a commonly used material for marking chart paper in such recording instruments. Inking systems typically rely on capillary feeding means and this has been found to limit writing speeds to approximately forty inches per second average velocity. Even at this speed some skipping of the ink line occurs.

Means have been sought for attaining a continuous ink line at higher pen speeds than have previously been possible. Typical problems encountered are inking system bleeding under some operating conditions, and criticality of the ink supply location and ink supply level.

Pressurized inking systems have been devised in an effort to overcome the above mentioned skipping problem, but these have resulted in bleeding at low writing speeds. Other efforts have required special inks and specially pointed pens and specially surfaced chart papers, all of which naturally involve penalties in cost, difficulty of replacement, and general inconvenience. Yet, even though efforts heretofore have encountered serious difficulties, it still remains the consensus of opinion that the best permanent record (at least psychologically) is made by ink. It is therefore a general object of the present invention to provide an improved recording instrument.

It is a further object of the present invention to provide a recording instrument capable of producing ink chart records with pen tip speeds much greater than forty inches per second.

A further object is to provide an instrument wherein the high speeds are attainable without the necessity of employing special inks or chart papers, and without incurring bleeding when the pen is moving at average or lower speeds, or has stopped.

A further object is to provide an inking system for high speed writing and which can be incorporated in existing conventional recording instruments.

Described briefly, in a typical embodiment of the present invention, a recording instrument is provided with an inertia pump in the path of ink from a reservoir to the writing tip of the pen. The pump has a housing mounted in a fixed relationship to the pen and which, therefore, moves with the same acceleration and speeds as does the pen. A piston is employed in the pump housing, and is movable relative to the pump housing in the direction of motion of the pump housing as the pen operates. The inertia of the piston is effective to pump fluid toward the tip from the reservoir as the result of accelerations of the pen. Suitable check valves are employed for pumping action in both directions, and accumulator means are employed to maintain adequate ink supply pressure at the tip during high writing speeds, this pressure being derived from the pumping action of inertia pump.

The full nature of the invention will be understood from the accompanying drawings and the following description and claims.

FIG. 3 is an enlarged fragmentary section through the pen and pumping means, the section being taken along the line 3—3 in FIG. 2 and viewed in the direction of the arrows.

FIG. 4 is a section through FIG. 3 taken along the line 4—4 and viewed in the direction of the arrows.

FIG. 5 is a vertical fragmentary section through another embodiment of the pump showing a variation in the ink supply arrangement.

FIG. 6 is a schematic top plan view illustrating another embodiment of the invention.

Figure 1:
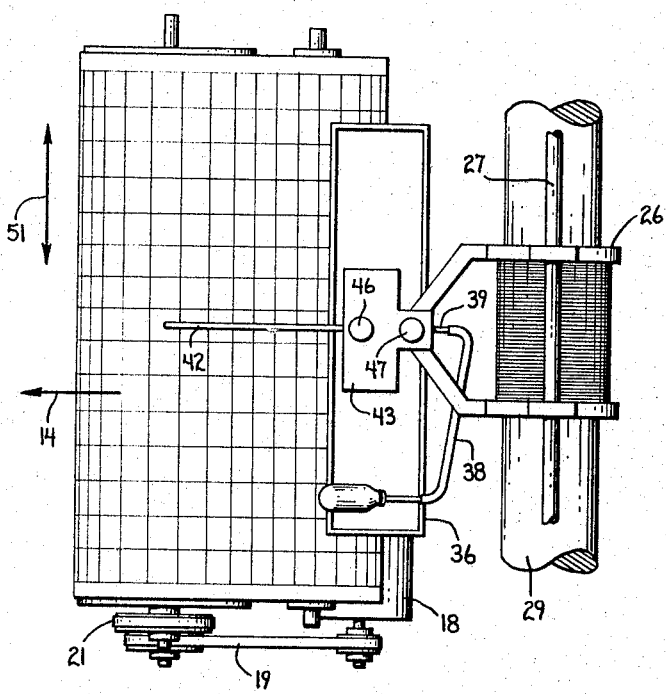
FIG. 1 is a top plan view in schematic form, of a recording instrument representing a typical embodiment of the present invention.
Figure 2:
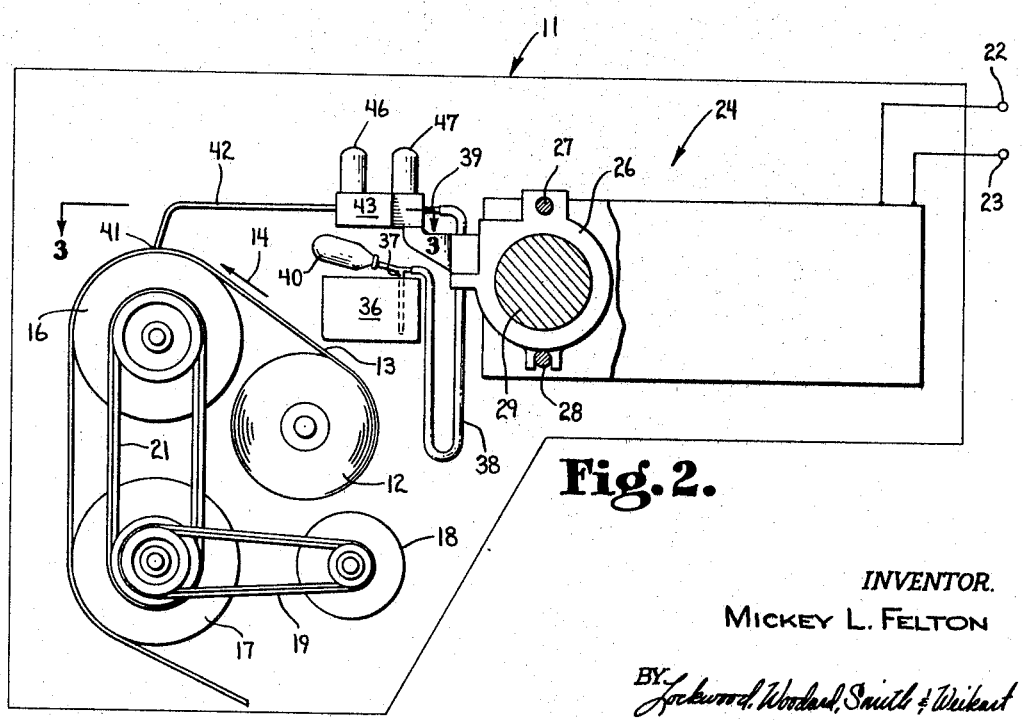
FIG. 2 is a side elevational view thereof, principally in schematic form.

Referring to the drawings in detail, the recording instrument 11 is provided with a supply roll 12 of chart paper 13 which is driven in the direction of the arrow 14 by spools 16 and 17 driven by the motor 18 through suitable power transmission means 19 and 21. If desired, other forms of chart drives could be employed and it is not essential that the chart paper be on rolls.

The illustrated instrument is intended to respond to electrical input signals, so input terminals 22 and 23 are provided to receive the signals which are to be recorded by the instrument. These terminals are connected to signal responsive pen drive means 24. An example of pen drive means of a type with which the present invention can be used advantageously, is the servo recorder described by J. R. Judkins and Evan Kesseler on pages 100 through 103 of Instruments and Control Systems, volume 36, August 1963. That servo recorder employs a bobbin or shuttle 26 guidingly received on the guide rod 27 and prevented from rotation thereon by the rod 28. The shuttle has coils thereon and is responsive to signals at the input terminals to move along the magnet bar 29 and produce a chart record.

An ink reservoir 36 is provided from which ink may be taken through the tube 37 and flexible tube 38 into the pen tube 39. The pen is mounted to the shuttle in the servo recorder described in the above article, and the writing tip 41 of the pen 42 is at the surface of the chart paper 13. However, according to the present invention a housing or inertia pump body 43 is mounted to the shuttle and the tube 39 is connected to the pump body to supply ink thereto. The pen 42 is mounted to the front end of the pump body. So the housing has a fixed relation to the writing pen. Accumulators 46 and 47 are mounted to the pump body, for a purpose which will become apparent as the description proceeds. For priming the pen, if necessary, a conventional priming bulb 40 is connected to the tube 37.

As viewed in FIG. 1, the direction of arrow 14 represents the direction of motion of the paper at the pen writing tip. The pen drive means provides movement of the writing tip in a direction transverse to that of the arrow 14. In other words, the writing tip moves in the direction of the arrow 51. It happens that because of the particular drive means employed in the disclosed embodiment of this invention, the direction 51 is at 90 degrees to the direction 14. However in other recording instruments the writing tip moves in a curvilinear fashion but, for purposes of the present invention, it is to be considered that this curvilinear motion is also in a direction transverse to the direction of arrow 14.

Referring now to the enlarged drawings of FIGS. 3 and 4, the pump body is provided with a cylindrical bore 54 having an axis 56 extending generally in the direction of the arrow 51. In a curvilinear instrument, also, the axis 56 would extend generally in the direction of the action of the pen at the writing tip, which action is transverse to the direction of paper motion at the point where the writing takes place. This would also apply to other types of chart recording instruments, including the type using a circular disc form of chart paper.

A ball piston 57 is fittingly received in the bore 54 but is free to move axially thereof between the ends thereof for the pumping action. The ball is made of a material having sufficient size and weight to obtain the desired pumping action as the result of the inertia of the ball as the pen is accelerated transverse to the direction of the chart paper in response to applied input signals. Ball centering means, such as springs 55 for example, can be employed if desired.

The supply of ink to the bore is provided through an inlet port 58 in the wall of the bore midway between the ends thereof, this port communicating through a passageway 59 to the supply tube 39. An accumulator 47 is provided with a charge of gas (usually air) 62 therein and a supply of ink 63 therein, the level 64 of the ink being high enough to assure that the gas 62 is isolated from the path of ink through the passageway 59 from the tube 39 to the bore 54. This accumulator 47 enables the use of small diameter ink supply lines 38 and 39, if desired, to minimize the inertia of this portion of the instrument. Accumulator 47 also smooths out the flow of ink to the bore 54 to avoid surging which might otherwise occur as a result of swinging of the flexible ink supply tube 38 or other components between the reservoir and the pen point.

Two passageways are provided to receive ink pumped out of the bore by the piston 57. The first passageway 66 opens into a first check valve caging cavity 67 which is cylindrical and has a ball check valve 68 therein, the cylindrical axis of the cavity 67 being colinear with the axis of the bore 54. The second passageway 69 communicates with the second cylindrical valve cage cavity 71 in which the second ball check valve 72 is located. The check valve seat 73 against which the ball 68 is positionable for seating, faces away from the bore 54, as does the check valve seat 74 on which the check valve ball 72 seats.

The distance of the end 76 of the first cavity from the valve seat 73 thereof is limited so that the possible extent of travel of the check valve ball in the cavity bore is minimized. The same type of construction is employed in cavity 71. In this way, fast and efficient action of the check valves in closing and opening is achieved.

When the pen is accelerated in the direction of the arrow 77, the inertia of the ball piston 57 resists acceleration in that direction so that there is relative movement of the piston 57 in the bore toward the cavity 71. This causes check valve ball 68 to seat and check valve ball 72 to unseat whereupon ink is forced through passageway 69 and cavity 71 and passageway 78 toward the writing tip. Similarly, upon acceleration of the pen in the direction of the arrow 79, the piston 57 moves toward cavity 67, positioning check valve ball 72 on its seat and check valve ball 68 moves off its seat so that ink is moved from the bore into passageway 66 and in passageway 81 it is moved toward the writing tip.

The inlet 83 of the second accumulator 46 is provided at the ends of the passageways 78 and 81. The second accumulator, like the first accumulator, has a charge of gas 84 therein and a supply of ink 86 isolating the gas from the path of ink from the passageways 78 and 81 to the pen point 42.

In effect, the ball piston 57 divides the bore 54 into two chambers of equal volume, the volume of each of the chambers being variable to increase or decrease depending on the direction of motion of the ball in the bore. So in this particular embodiment, the piston provides one inertia-actuated movable wall common to the two chambers into which it divides the bore 54.

Because of the provision of the accumulator 46, the pressure developed in the pump during acceleration of the pen is stored so that an adequate supply of ink to the writing tip is maintained during high-speed writing, even during the short periods when no acceleration or deceleration may be present. It should be observed also that deceleration of the pen has the effect of acceleration in the opposite direction, so that pumping is obtained during both acceleration and deceleration.

It may be found desirable to select pump components and pen tube and accumulator dimensions such that the time it would take for pump developed pressure in accumulator 46 to be dissipated would about equal the time required for the pen to move from one side of the chart to the other. It is desirable that the time constant for the components between accumulators be much (perhaps ten times) less than this, in order to enable development of adequate pressure in accumulator 46 during the period of high acceleration.

During low-speed operation of the pen, the pressure in accumulator 46 will return to normal whereupon the proper flow of ink to the writing tip will be obtained by the usual capillary action. Then, if the pen stops moving at all, the presence of normal near-atmospheric pressure in the accumulator will not encourage bleeding.

From the foregoing description, it will be seen that according to the present invention, when the pen is not being accelerated, the ink flows by capillary action. As the pen is accelerated, capillary pressure is assisted by pressure from the inertia pump. This pump pressure is directly proportional to pen acceleration.

Referring now to FIG. 5, there is illustrated a vertical section through the valve body of a pump assembly representing a variation of construction. Functionally speaking, this valve body is much the same as that of FIGS. 3 and 4 and accordingly the same reference numerals are applied to parts which correspond functionally such as the ball piston 57, the check valve seats 73 and 74, and the check valve cavities 67 and 71. However the provisions for ink supply to the bore 54 are somewhat different in that, instead of having a single centrally located port 58 of FIGS. 3 and 4, separate inlet ports 91 and 92 are provided. These ports serve as housings for inlet check valve balls 93 and 94 which normally rest on the ball retainers 96 and 97, respectively, and are therefore away from the valve seats 98 and 99, respectively. The inlet passageway 59 from the accumulator 47 supplies ink to the chambers 101 and 102 above the inlet check valves 93 and 94, respectively.

When the pen is accelerated in the direction of the arrow 77, the ball piston 57 moves toward the outlet check valve cavity 71 whereupon the inlet check valve 94 is seated upon its seat and the inlet check valve 93 remains unseated, admitting ink from the chamber 101 through the port 91 into the chamber 54a of the bore 54 behind the ball piston 57. In contrast, when the pen is accelerated in the direction of the arrow 79, the ball piston moves toward the outlet check valve cavity 67, thereupon seating the inlet check valve 93 and opening the inlet check valve 94 to admit ink from the chamber 102 through the port 92 and into the chamber 54b behind the ball piston. In this embodiment of the invention, as well as in the previous embodiment, configurations of the pump piston and the various check valves, other than the ball configuration shown, may be employed.

In fact, a further variation within the scope of the present invention would omit the pump piston itself, and this variation is shown schematically in FIG. 6.

Referring to FIG. 6 in detail, a top plan view in schematic form represents a pump body 106 mounted to the shuttle 26 and having an ink supply tube 39 at the rear end thereof and a pen 42 at the front end thereof. The supply tube is connected to an accumulator 47 and the pen tube is connected to an accumulator 46. A first elongated passageway 108 extends in the directions 77 and 79 which are the directions of acceleration of the pen. A second elongated passageway 109 also extends parallel to passageway 108. It is the inertia of the ink in these passageways which achieves the pumping action. For this purpose, check valves are employed, and communication between passageway 108 and passageway 109 is provided through passageway portions 113 and 114 respectively, which have additional accumulators 111 and 112 therein.

Check valves 116 and 117 and their valve seats 118 and 119, respectively, are oriented so that when the pen is accelerated in the direction of the arrow 79, the inertia of the valve 116 will tend to unseat it and that of valve 117 will tend to seat it. On the other hand, check valves 121 and 122 and their seats 123 and 124, respectively, are oriented so that the inertia thereof when the pen is accelerated in direction of the arrow 79 will tend to close the check valve 121 and open the valve 122.

The effect of this arrangement is that when the pen is accelerated in the direction of the arrow 79, the ink in passageway 108 to the left of the inlet from accumulator 47 moves relative to the valve body 106 in the direction of the arrow 77 and pressurizes accumulator 111. The ink in passageway 109 also tends to move in the same direction relative to the valve body but the check valve 121 will be closed. Therefore any pressure stored in accumulator 112, and the inertia of that portion of the ink in passageway 109 which is to the right hand of the outlet from the passageway 109 to accumulator 46, will raise the pressure in accumulator 46 and urge ink out through the pen 42. Any pressure stored in accumulator 112 will not cause filling of passageway 108 because the check valve 117 will be seated. In the same manner, when the pen is accelerated in the direction of the arrow 77, the ink in passageway 108 to the right of the inlet from accumulator 47 will pressurize accumulator 112, and the pressure in accumulator 111, together with the inertia of the ink in the portion of the passageway 109 to the left of the outlet to accumulator 46, will pressurize accumulator 46 and urge ink out through the pen 42. In this embodiment of the inertia pump, and in the previously described embodiments thereof, the pump need not be mounted to a member moving rectilinearly, because it is the acceleration which produces the pumping action. Also it is not intended that the present invention be limited at all to positioning the check valves to seat and unseat by moving in the direction their own inertia would take them, because even if positioned to seat and unseat by moving in a direction normal to that of pump acceleration, the inertia-caused ink movement would seat and unseat them.

If desired, various materials may be employed for various portions of the structure of the present invention, clear plastic being one example for the pump body and accumulators. In this way the weight can be minimized while the assembly will have a professional appearance. Although a stainless steel ball may be employed for the pump piston other materials may also be found to be satisfactory.

While the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claims.

The invention claimed is:

1. In a variable pressure inking system, the combination comprising:
   a writing point;
   an ink reservoir;
   and a pump connected between said reservoir and said point, said pump having a first member affixed to said point, and said pump having a second member movable in a first direction with respect to said first member and operable upon relative movement between said second and first member to pump ink from said reservoir to said point, said second member including a mass resisting acceleration thereof in a second direction opposite said first direction, whereby acceleration of said first member with said point in said second direction causes said relative movement to pump ink from said reservoir to said point.

2. In a variable pressure inking system, the combination comprising:
   a writing point;
   an ink reservoir;
   ink conducting means connected between said reservoir and said point,
   and said ink conducting means including a portion having a pump therein, said pump including a first member and a second member, said first member having a chamber therein and said second member including a pumping element movably mounted in said chamber and operable therein upon relative movement between said chamber and said element to pump ink from said reservoir to said point, one of said members being affixed with respect to said point and accelerable therewith, and the other of said members including a mass resisting acceleration thereof upon acceleration of said point to thereupon product said relative movement between said chamber and said pumping element and pump ink to said point upon acceleration thereof.

3. In a variable pressure inking system, the combination comprising:
   a writing point;
   an ink reservoir;
   ink conducting means connected between said reservoir and said point,
   said ink conducting means including a pump body affixed to said writing point and having a cylindrical chamber therein, with supply means providing communication between said reservoir and said chamber, said body having first and second cavities therein and a first opening between said first cavity and one end of said chamber and a second opening between said second cavity and the other end of said chamber;
   a first check valve in said first cavity and a second check valve in said second cavity, said pump body having a valve seat in the opening between each cavity and said chamber, each of said check valves being positioned on one of said valve seats to prevent ink flow to said chamber from the cavity in which the valve is located;
   a piston fittingly received in said chamber and freely movable therein between the ends thereof, to move ink from said chamber into said cavities,
   said chamber, cavities, valves and valve seats being oriented such that acceleration of said writing point in a first direction causes said piston and check valves to move in a second and opposite direction relative to said body to close said first valve seat and open said second valve seat and pump ink from said chamber toward said second cavity, and acceleration of said writing point in said second direction causes said piston and check valves to move in said first direction relative to said body to close said second valve seat and open said first valve seat and pump ink from said chamber toward first cavity.

4. The combination as set forth in claim 3 wherein:
   said piston and said check valves are in the form of spheres, said piston having sufficient density for the inertia thereof to pump the ink;
   and the cavities confine said check valves to limit the extent of their travel off their seats to insure rapid seating and unseating in response to action of said writing point and piston.

5. The combination as set forth in claim 3 wherein said supply means includes:
   first and second inlets to said chamber near opposite ends thereof;

a first ink supply line from said reservoir to said pump body;
a first supply passageway between said supply line and said first inlet;
a second supply passageway between said supply line and said second inlet;
a third check valve in said first supply passageway and a fourth check valve in said second supply passageway, said check valves being oriented to permit flow therethrough only toward said chamber and facilitating filling of said chamber with ink behind said piston as it moves away from one of said inlets.

6. The combination set forth in claim 3 and further comprising:
a gas accumulator connected to said cavities and having a charge of gas therein, said accumulator being positioned to retain said gas charge out of the path of ink flow from said cavities to said writing point, and the accumulator having a supply of ink therein, whereby transmission of gas from said accumulator to said writing point is avoided, said accumulator being subject to increased gas pressure therein as gas is compressed by ink pumped by said pump when said pen is accelerated, the gas pressure therein being applied to the ink flowing to the writing point.

7. In a variable pressure inking system, the combination comprising:
a writing member;
an ink source;
pumping means connected to said writing member and to said source, said pumping means being mounted to said writing member and accelerable therewith, said pumping mens including a portion relatively movable with respect to said writing member and having sufficient mass and inertia to resist acceleration and thereby move relative to said writing member upon acceleration of said writing member and thereby pump ink to said writing member.

8. The combination of claim 7 wherein:
said movable portion defines at least part of a wall of a variable-volume ink-containing chamber in said pumping means.

9. A recording instrument comprising:
signal input means;
first drive means coupled to said input means and having an output member, said drive means being responsive to changes of signals applied to said input means to move said output member;
a record medium adapted to receive and retain ink marks;
second drive means driving said record medium;
a pen having a point on said record medium, said pen being connected to said output member whereby said point is movable across said record medium in a first direction in response to changes of signals applied to said input means;
a source of ink;
and pumping means coupled to said source and to said pen point for pumping ink from said source to said point, said pumping means being mounted to said output member and movable thereby in said first direction, said pumping means including a portion relatively moveable with respect to said pen in a second direction opposite said first direction and having sufficient inertia to move relative to said pen in said second direction upon acceleration of said pen in said first direction to thereby pump ink to said pen point.

10. A recording instrument comprising:
signal input means;
first drive means coupled to said input means and having an output member, said drive means being responsive to changes of signals applied to said input means to move said output member;
a record medium adapted to receive and retain ink marks;
second drive means driving said record medium in a first direction;
a pen having a point contacting said record medium and having a tube extending from said point, said pen being connected to said output member whereby said point is movable in a second general direction transverse to said first direction and across said record medium in response to changes of signals applied to said input means;
an ink reservoir;
a gas accumulator communicating with the end of said tube opposite said point, said accumulator retaining a charge of gas therein out of a path of ink flow from said reservoir to said pen point, said accumulator having an ink supply therein isolating said gas from said path whereby transmission of said gas from said accumulator to said pen point is avoided;
an inertia pump mounted to said output member, said inertia pump including a body having a cylindrical bore therein with an axis extending in said second direction, said bore having an ink inlet port in the cylindrical wall thereof equidistant from the opposite ends of said bore, said inlet port communicating with said reservoir through a supply line and feeding ink to said bore;
a ball piston freely disposed in said bore and responsive to accelerations of said pen in said second direction to move toward one or the other end of said bore depending on the direction of acceleration of said pen;
a first cylindrical cavity adjacent one end of said bore and having a cylindrical axis colinear with said bore axis;
a first passageway connecting said first cavity to one end of said bore;
a first valve seat at the junction of said first cavity and said first passageway and facing away from said bore;
a second cylindrical cavity adjacent the other end of said bore and having a cylindrical axis colinear with said bore axis;
a second passageway connecting said second cavity to the other end of said bore, said bore being located between said cavities;
a second valve seat at the junction of said second cavity and said second passageway and facing away from said bore;
a third passageway connecting said first cavity to said accumulator;
a fourth passageway connecting said second cavity to said accumulator;
a first ball check valve in said first cavity and positionable on said first valve seat when said ball piston is moving toward the said other end of said bore to close said first passageway and prevent entry of ink into said bore from said first cavity;
a second ball check valve in said second cavity and positionable on said valve seat when said ball piston is moving toward the said one end of said bore to close said second passageway and prevent entry of ink into said bore from said second cavity;
said ball check valves being thus arranged whereby one of said check valves is unseated and the other is seated upon acceleration of the pen, and said ball piston is fittingly received in said bore dividing said bore into two chambers having volumes variable according to the location of said piston with respect to the ends of said bore, whereby acceleration of said pen causes said piston to pump ink from said reservoir into said accumulator thereby compressing said gas in said accumulator during acceleration of said pen to continue to supply ink under pressure at said pen point upon constant velocity motion of said pen;
said supply line, bore, passageways, cavities, and tube being full of ink at all times maintaining a flow of ink to said pen point by capillary action during low-speed movements of said pen without acceleration; whereby a steady supply of ink at said pen point is maintained under all operating conditions of said pen.

11. In a variable pressure inking system, the combination comprising:
    writing means;
    an ink reservoir;
    and a pump connected between said reservoir and said writing means, said pump having a member mounted in fixed relation to said writing means, said member having means therein of sufficient mass to be moveable therein and relative thereto in response to acceleration of said member with said writing means to pump ink from said reservoir to said writing means.

12. In a variable pressure inking system, the combination comprising:
    writing means;
    an ink reservoir;
    drive means driving said writing means;
    and pumping means communicating with said reservoir and said writing means and connected to said drive means and operable in response to accelerations of said drive means for pumping ink from said reservoir to said writing means in response to accelerations of said drive means.

13. In a variable pressure inking system, the combination comprising:
    a writing point;
    an ink reservoir;
    drive means connected to said writing point and responsive to input signals for driving said writing point;
    and pump means mounted to said driving means for pumping ink from said reservoir to said writing point, said pump means including a first passageway extending generally in a direction of back and forth acceleration of said drive means, said first passageway having an inlet thereto and an outlet, the inlet being connected to a supply line from said reservoir and the outlet being connected to a first accumulator, said pump means having a second passageway extending generally in a direction of back and forth acceleration of said drive means, said second passageway having an inlet connected to said accumulator and an outlet connected to said writing point,
    a first check valve in said pump, said first check valve being oriented to prevent flow of ink in said first passageway from said first accumulator toward said inlet to said first passageway,
    a second check valve in said pump, said second check valve being oriented to prevent flow of ink in said second passageway from said writing point toward said first accumulator,
    the ink in said first passageway, as the result of its inertia, being responsive to acceleration of said drive means in a first direction to move into said first accumulator,
    the ink in said second passage, as the result of its inertia, being responsive to acceleration of said drive means in a second direction opposite said first direction to move to said writing point.

14. The combination as set forth in claim 13 and further comprising a second accumulator at the said inlet to said first passageway and a third accumulator at the said outlet from said second passageway.

15. The combination as set forth in claim 14 and further comprising:
    a fourth accumulator connected between a second outlet of said first passageway and a second inlet of said second passageway,
    a third check valve between said fourth accumulator and said inlet to said first passageway,
    a fourth check valve between said fourth accumulator and the outlet of said second passageway, said third and fourth check valves being oriented so that acceleration of said drive means in said first direction closes said third check valve and opens said fourth check valve to permit flow of fluid from said fourth accumulator through said fourth check valve to said writing point, and acceleration of said drive means in said second direction is effective to open said third check valve and close said fourth check valve to permit flow of fluid from said first passageway into said fourth accumulator for pressurizing said fourth accumulator.

16. The combination as set forth in claim 15, and wherein:
    said drive means are constructed to move and accelerate said pump means rectilinearly in said first and second directions.

References Cited

UNITED STATES PATENTS

| Re. 25,692 | 12/1964 | Brown | 346—140 |
| 3,169,821 | 2/1965 | Miller | 346—140 |

FOREIGN PATENTS 753,407  8/1933  France.

RICHARD B. WILKINSON, *Primary Examiner.*

M. LORCH, *Assistant Examiner.*